FIG. 1

Nov. 13, 1956   F. FAULHABER   2,770,177
COMBINED SHUTTER SETTING AND FILM TRANSPORTING MECHANISM
Filed Dec. 30, 1953   7 Sheets-Sheet 3

FIG.3

INVENTOR
Fritz FAULHABER

FIG. 6

INVENTOR
Fritz FAULHABER

Nov. 13, 1956 F. FAULHABER 2,770,177
COMBINED SHUTTER SETTING AND FILM TRANSPORTING MECHANISM
Filed Dec. 30, 1953 7 Sheets-Sheet 6

FIG. 7

INVENTOR
Fritz FAULHABER

United States Patent Office 2,770,177
Patented Nov. 13, 1956

2,770,177

COMBINED SHUTTER SETTING AND FILM TRANSPORTING MECHANISM

Fritz Faulhaber, Schonthal (Wurttemberg), Bezirk Bob-lingen, Germany, assignor to Voigtlander, A. G., Braunschweig, Germany, a corporation of Germany Application December 30, 1953, Serial No. 401,295

11 Claims. (Cl. 95—31)

This invention relates to a combined shutter setting and film transporting mechanism for photographic cameras.

The main object of the present invention is to provide a combined mechanism for the simultaneous setting of the shutter and for advancing the film in order to position the desired length of unexposed film for exposure. Said mechanism shows maximum reliability in operation and is nevertheless highly insensitive to tolerances or play occurring in use. This object is attained in the device according to the invention by a combination of several elements and features described hereinafter.

Other objects and the advantages of the invention will be apparent from the appended claims and drawings and the following specification which describes, by way of example and without limitation, some embodiments of the invention.

According to the present invention, all steps which belong to the beforementioned range of functions, are contemplated to be included in, and actuated by, only one control stroke of a control pin, i. e. the steps for preparing for the transport of the film (such as lifting the pressure plate at the picture window, shifting from the locking position to the release position of other elements obstructing advance of the film), as well as transport of the film in order to position the necessary length of fresh film for exposure, setting of the shutter, switching steps for actuating double-exposure prevention, locking the transport of unexposed film and of the counting disc. This extensive combination is novel and represents a considerable improvement over the known mechanisms of photographic cameras.

In order to obtain reliable and exactly timed operation of the device according to the invention, it has been taken into consideration that, according to experience, the members for executing almost all of the above mentioned functions have a tolerance of smaller or larger size, which is often increased in use. Therefore, the invention contemplates addition of a safety factor in the control stroke. In connection with the rapid transport of the film, the control of tolerances in setting the shutter is of particular importance, because it is necessary that a hard impact occurs at the end of each setting stroke.

According to the invention, the means used for setting the shutter and for advancing the film comprise a control pin, which is known per se. This pin has an initial position, in which it considerably protrudes from the camera and is actuated by almost completely depressing it into the interior of the camera. The control pin proper causes actuation of a spindle provided with a spiral guide surface, and it is essential according to the invention that said spiral is specifically arranged on the spindle and is limited to a specifically selected range of the spindle, as described in detail further below.

The total control stroke of the control pin is, therefore, composed of several portions. First, the control pin is advanced without causing rotation of the spindle. This is the period, in which the pressure plate is lifted and other elements obstructing advance of the film are shifted. The next period is that of the film transport and the length of the steep spiral on the beforementioned spindle, is adapted to this period. Setting of the shutter takes place at the same time, and the duration of this step and the length of the control movement is determined in such manner that always, i. e. at any occurring tolerance, the actual ending of the setting step occurs later than the end of advancing the film. As the beforementioned spiral motion must coincide with the end of the film transport, which is determined by the length of the image, the end of the stroke for setting the shutter should extend beyond the end of the spiral by such an amount that already the beginning of the tolerance range of the end of setting comes within the range of feed of the control pin, in which no rotation of the spindle takes place, i. e. where the spindle is smooth. The user of the camera will then automatically feel the hard impact at the end of the setting step, without particularly watching it. If the control stroke of the beforementioned control pin is continued somewhat beyond said condition, no harm to the gear will be done, because care is taken that the member shifting the setting lever of the shutter would carry out the eventual excess stroke as an idle stroke, after the end of the setting movement is attained.

According to an embodiment of the invention, a pinion which is caused to rotate by the turning movement of the control spindle and constantly meshes with a cog wheel of the film feed spool, is displaceably arranged on the control spindle. Depending on whether said pinion is in the lifted or lower position, it may be or not be rotated by the action of a driving pin or the like, which is fixedly connected with the control spindle, during rotation of said spindle, caused by the action of the above mentioned spiral. During rotation, said driving pin bears against the flank of a cam element firmly connected with said pinion, said cam element being formed as a ring segment. It loosely encircles the control spindle along a considerable part, for example ⅔ or ¾, of its periphery. This ring is provided with a sloping inclined lower surface which extends and declines from the beforementioned, abutting flank for the driving pin, toward its end. If thus, after advancing the film, the control pin is lifted again by spring impulse upward and out of the camera casing into the ready for exposure position, said driving pin of the control spindle, which takes no part in said upward movement, glides under the lower surface of said cam and presses the latter and the pinion upward, during the backward rotation of the spindle, caused by the spiral.

The length of the spiral of the control spindle is selected in such manner that the driving pin safely glides under and beyond the highest point of the surface of the now stopping cam and takes a position in the space not occupied by the cam. This end position is determined by the tolerances. Owing to the arrangement according to the present invention, it is immaterial, where the end position of the driving pin in each case is, as the film transport will be always started at exactly the same moment with reference to the other functions of the mechanism. By themselves, the pinion and the cam fastened thereto would be depressed again at once by spring effect to the normal position, after the driving pin has passed below the farthest projecting point of the cam ring. In this case, however, there would be the danger of an unexposed portion of the film being advanced and wasted, upon repeated actuation of the film advancing means. This is prevented by keeping the pinion in the lifted position, in which it is inactive with regard to the transport of the film, until release of the shutter has taken place. This effect is obtained by the use of a spring held locking lever or the like, which constantly bears against the beforementioned collar fastened to the pinion and carrying the cam. At the moment when the pinion and the cam connected therewith are brought out of the possibility of engagement with the driving pin, i. e. are lifted to a corresponding height above the swinging plane of the driving pin, the beforementioned locking lever snaps under the cam and remains there. Thus, in this situation, repeated actuation of the control pin, causes turning movement of the control spindle by means of the beforementioned spiral, but the film cannot be advanced. If now a picture is taken, the release pin actuated in taking said picture withdraws said locking lever, by the same stroke, from the locking position, i. e. from its position under the cam connected with the film transport pinion, and, owing to spring impulse, the pinion is brought at once into the transport position, i. e. in a position of the engagement range of the driving pin.

The pinion is connected also with an eccentric against the flank of which a spring held transmission lever bears. In a corresponding position of the eccentric, this lever transmits a throw to the disc of a counting mechanism. The eccentric is adjusted in such manner that substantially in accordance with said cam ring the control step is terminated simultaneously with the termination of the film transport.

In the appended drawings—

Figure 1:
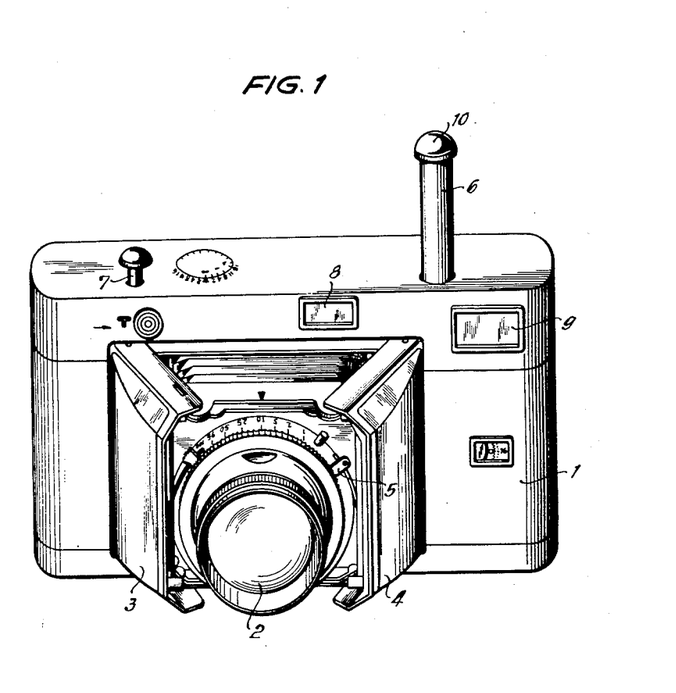
Figure 1 is the perspective view of a photographic camera which comprises a built-in combined shutter-setting and film transport mechanism according to the present invention, and in which the release key and the film transport control pin are advanced to operative position.

Referring now to the drawings in detail, reference numeral 1 denotes a roll film camera, the objective 2 of which is held in the ready for action position shown in Figure 1, by two cover parts 3 and 4. The latter are connected with a not specifically denoted spreader arrangement. 5 is the setting lever of the shutter, which is actuated by the device according to the invention. 6 is the control pin which is automatically brought by spring effect into the position shown in Figure 1, upon opening the camera. After closing the camera, i. e. moving the objective to the interior of the camera and snapping cover parts 3 and 4 to the closed position, control pin 6 is depressed into the camera body by the application of slight pressure thereto, and remains there in locked position until the camera is opened again. This does not form part of the present invention.

In closed position of the camera, pin 6 does not substantially protrude beyond the upper edge of the camera. 7 denotes the release key, which, in the embodiment shown, serves also for releasing cover parts 3 and 4 locked in the closed position, so that the objective of this camera automatically snaps to the ready for exposure position. Pin 7 simultaneously serves also for actuating the shutter release. In closed position of the camera, pin 7 may be also depressed by slight pressure to such extent that it does not substantially protrude beyond the upper edge of the camera. Reference numerals 8 and 9 denote windows of the camera.

Figure 2:
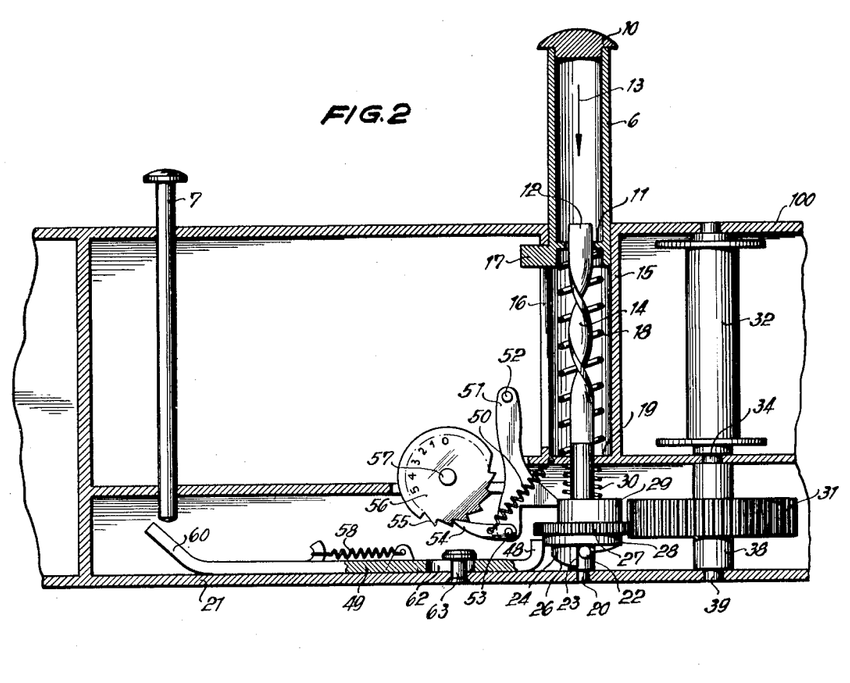
Figure 2 diagrammatically illustrates on an enlarged scale the film-transporting mechanism in operable position; upon pressing down the control pin or key, winding of the film spool takes place.

In the structure shown in Figure 2, 100 denotes the upper surface of the covering cap placed on upper surface 21 of the camera. The control device according to the present invention is housed by this cap.

As shown in Figure 2, control element 6 is formed as a sleeve, which is closed at its upper end 10 and carries, near its lower end, plate 11, by the perforation of which spindle 12 is guided. When sleeve 6 is moved for actuation in the direction of arrow 13, it does not cause displacement of spindle 12 in longitudinal direction. Beyond a certain part of its length, to be explained further below, said spindle 12 is provided with a steep spiral 14. While plate 11 provided with a perforation acting as a nut moves along spiral 14, spindle 12 rotates, the direction of rotation being determined by movement of sleeve 6 in downward or upward direction. The upper end and lower end of spindle 12 are smooth and during passage of these parts of the spindle through said perforation, the spindle does not rotate.

During its up and down movement, control element 6 is guided by sleeve 15 fastened to cap 100. This sleeve 15 is provided on one side with an elongated slot 16, which guides a projection 17 arranged at the lower end of sleeve 6. A spring 18 encircles spindle 12 and bears against bottom plate 19 of guide cylinder 15 and plate 11 of sleeve 6. This spring 18 constantly tends to move sleeve 6 to the retracted position shown in Figure 2. Spindle 12 is guided by a perforation of bottom plate 19 of guide sleeve 15 and is journaled by means of a pivot 20 in camera wall 21.

Near wall 21, spindle 12 carries a pin 22, which rotates together with the spindle. During rotation, said pin 22 abuts against the vertical surface 23 of a cam-like element 24. As diagrammatically shown in Figure 5, this cam surrounds like a ring a considerable part, for example ½ or ¾ of the periphery of spindle 12. Cam-like element 24 has an inclined surface which ascends from 25 toward 23, see Fig. 5, as indicated at 26 in Figure 2. Cam-like driving element 24 is displaceable on spindle 12 and is firmly connected with pinion 27. A collar 28 is arranged between pinion 27 and cam 24. An accentric 29 is seated on the upper surface of pinion 27. Assembled parts 24, 28, 27 and 29 form a structural unit, which can be displaced as a whole on spindle 12 and can be rotated independently. A spring 30 constantly presses this unit downward so that collar 28 rests on pin 22. During rotation of spindle 12, i. e. when element 6 is pressed in downward direction and spiral thread 14 is guided by plate 11, pin 22 drives the whole above mentioned aggregate 24, 28, 27, 29. This rotating movement is transmitted by pinion 27 to cog-wheel 31, which meshes with pinion 27 and is firmly connected to film spool 32 or with a film control wheel. As shown in Figure 2, spool 32 is guided in parts 34 and 100. Journal 34 serves as a nonrotatable coupling between spool 32 and shaft 38 of cogwheel 31. End part 39 of said shaft 38 is journaled in plate 21.

Figures 4, 5:
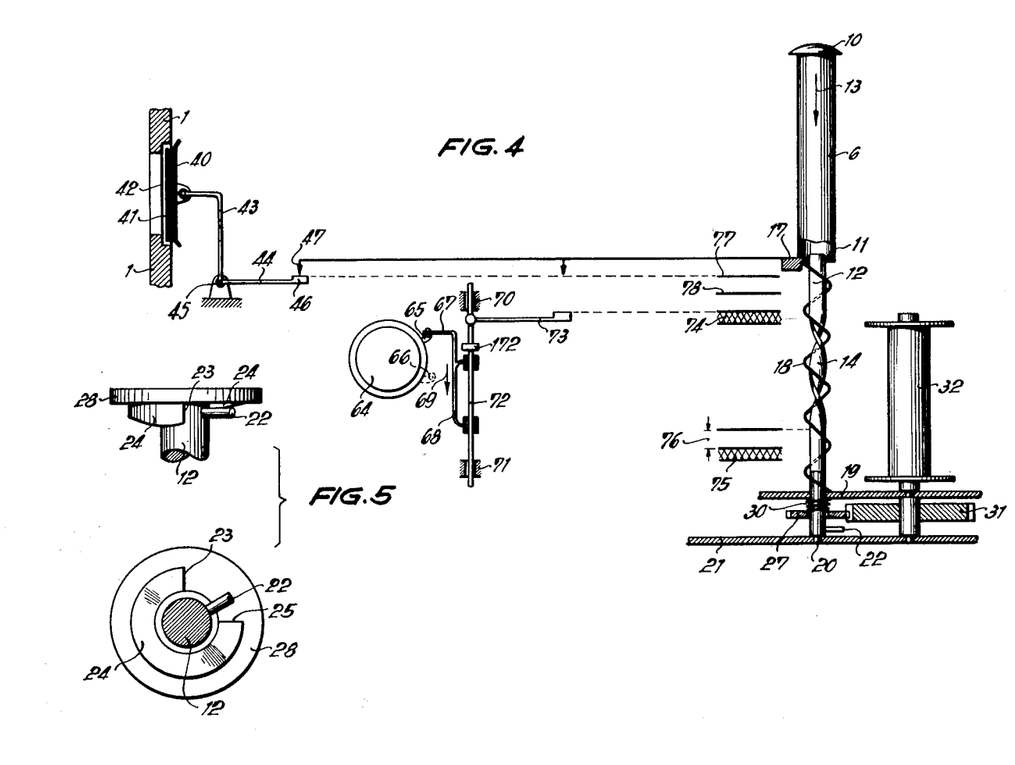
Figure 4 diagrammatically illustrates details of the device according to the invention and their reference to the timing of functions and to the consideration of tolerances occurring in the device.
Figure 5 is a diagrammatical bottom view pertaining to Figure 4 and shows position of coupling member 28 relative to pin 22, shortly after upward movement of control pin 6 has started.

It will be understood from the above that film spool 32 or the film control wheel turn only during the time interval, in which spindle 12 rotates, owing to the engagement of its part provided, for example, with a spiral, with perforated plate 11. The preceding control stroke of control pin 6, in which no turning of the spindle takes place, is utilized according to the present invention for bringing about other necessary functions. Figure 4 indicates diagrammatically how such functions can be derived from projection 17. Particularly the film pressure plate is lifted during this interval, as a preparation for winding the film. This is indicated in Figure 4 by a two-armed lever 43, 44, which is pivoted at stationary point 45 of the camera and is linked to pressure plate 40, which presses film 41 against picture window 42 of camera body 1; a force derived from projection 17 acts on end point 46 of said lever in the direction of arrow 47.

When the above mentioned winding of the film and the setting of the shutter, to be explained further below, have taken place, which is indicated by a certain resistance upon depressing pin 6, said pin can be held loosely or released, whereupon spring 18 presses released pin 6 upward out of casing 100. The stroke of pin 6 can be extended further than the end stop of the shutter setting. In a modification of the transmission lever, said lever will not further exert pressure after reaching the stop, but will move in a kind of idle stroke in the additional stroke portion which, as a rule, is short. In certain cases it is not easy to render the end position of film transport control pin 6 alike with the lower end position of member 103, 107 and thus with the end position of setting lever 5, and this could result in damage to lever 5. In order to avoid such damage, a conventional, generally used step can be used, i. e. insertion of a spring member within the gear train 6, 17, 107, 105 and 5 (see Fig. 6). This can be done in simple manner by substituting for the rigid member 105 a tension spring, e. g. a coil spring. During upward movement of pin 6, spindle 12 passes again the range of spiral 14 and its rotation has the following effect: Owing to the shape of cam-like part 24, indicated at 26, pin 22 fastened to spindle 12 comes to enter a position below said cam 24 and, subsequently, lifts cam 24 together with pinion 27, collar 28 and eccentric disc 29. In order to attain this, cam-shaped part 24 is designed at its end 25 in such manner that pin 22 must always safely enter a position under cam disc 24. Thus, in this position under cam-like part 24 of pinion 27, no coupling and driving of this pinion is brought about. Thus, this back movement of pin 6 occurs without movement of the film.

Under the impulse of spring 50, a lever 51, which is pivoted at stationary point 52 of the camera, is drawn to eccentric 29. Lever 51 carries at 53 a click 54, which engages teeth 55 of counting disc 56, rotatable at a stationary point 57 of the camera casing. As spiral 14 is so dimensioned that a complete control stroke of pin 6 will correspond to one revolution of spindle 12, eccentric 29 causes click 54 to carry out every time one counting step in counting-disc 56. Of course, the device could also operate with more than one revolution, without changing the fundamental character of the invention.

Figure 3:
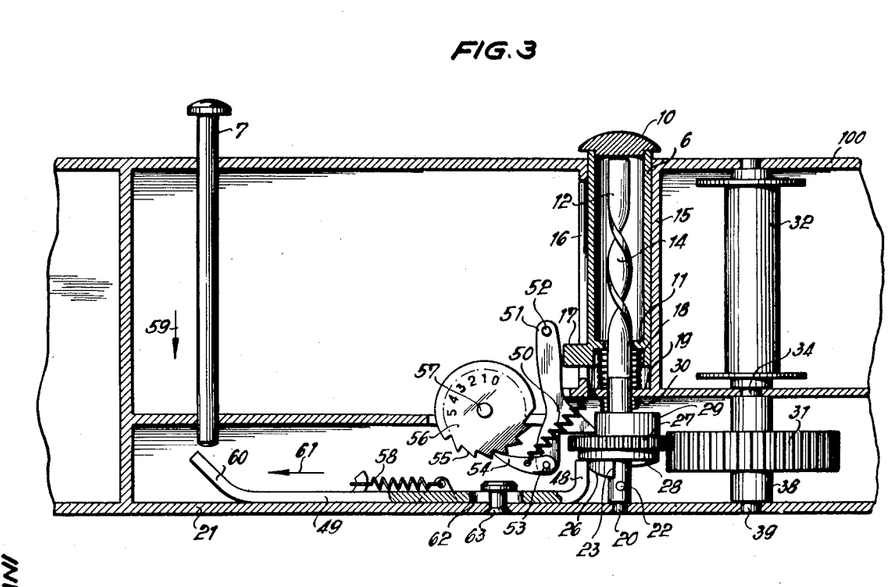
Figure 3 is a view similar to that of Figure 2, in which, however, the control pin is in completely pressed down position after transport of the film, in which eccentric 29 is already uncoupled from spiral 14 and is held in its uncoupled position by member 48, 49 of the film transport locking means.

Cover plate 21 of the camera casing is provided with a locking lever 49 which has an upwardly extending locking projecting 48. The length of this projection 48 is selected in such manner that in raised position of pinion 27, it just reaches the lower surface of collar 28 connected with pinion 27. This position is illustrated in Figure 3. A spring 58 constantly urges locking lever 49 to this position, so that pinion 27 once moved to the raised position, is held in this position as long as locking projection 48 is not removed from its locking position. This removal is effected according to my invention by actuation of release key 7. If this key is caused to move in the direction of arrow 59, it abuts at a correspondingly shaped end portion 60 of locking lever 59, or at a transmission member, and causes displacement of the latter and movement of the locking lever in the direction of arrow 61, so that projection 48 is withdrawn from its position under collar 28. In this movement, locking lever 49 is guided by a slot 62 provided in said lever and a guide bolt 63 fastened to camera casing 21. As soon as locking projection 48 releases pinion 27, spring 30 presses the aggregate downward until it abuts again with collar 28 at pin 22 which serves simultaneously as a stop member.

In the construction of the combined shutter-setting and film transport mechanism according to my invention, I prefer arrangement of control pin 6 on one side of the camera, for example for actuation by the index finger of the left hand, and arrangement of release key 7 on the other side of the camera, for example for actuation by the index finger of the right hand. Such arrangement is not only convenient but useful, because it prevents errors in actuating the camera.

Figure 4 diagrammatically illustrates cooperation of the individual elements during the course of control movement of pin 6. Some of the reference numerals used in Figures 2 and 3 are indicated also in Figure 4. As additional reference numerals, 64 denotes the shutter, while 65 and 66 denote the setting lever in two different positions. It has been diagrammatically indicated in Figure 4 that movement for the setting stroke is transmitted from pin 6 and its cam 17. This transmission is brought about over certain gear elements indicated at 73, which act on member 72, movable in guide bearings 70 and 71. Member 72 is provided with an element 172, which is adapted to cause angle lever 67, 68 to carry out a setting stroke in the direction of arrow 69 and thus bring about setting of the shutter.

Reference numerals 74 and 75 diagrammatically indicate, at a considerably enlarged distance from each other, the tolerance ranges of the start and end of the setting stroke and it is shown that the upper tolerance limit in the drawing of the end of setting 75 is still below the end of spiral 14. Thus, between said end of spiral 14 and said upper tolerance limit of range 75, there is a safety span 76, so that the operator of the camera will distinctly notice the hard impact of the end of setting and the distinctness of the latter is not blurred by a certain resistance occurring in the control stroke during the winding of the film. Figure 4 also indicates that control of lifting pressure plate 40 at 46 is likewise derived from member 17 of control pin 6.

Reference numerals 77 and 78 diagrammatically indicate that the range of this control step is located distinctly above the limit of the active range of spiral 14.

Furthermore, it will be understood from Figure 5, that it is immaterial where the starting point of pin 22 during backward movement is, as long as it is situated in the range free from the effect of cam 24, between 23 and 25. Spiral 14 should be long enough in order to bring about turning of pin 22 under all circumstances to such extent that said pin is moved up to surface 23 of cam 24. This arrangement has also the effect of rendering the device according to my invention highly insensitive to tolerances.

Rotatable member or spindle 12 consists preferably of metal, for example iron. In the embodiment shown, the upper portion of about ⅔ of the total length of this member has a quadrangular cross-section and consists for example of band iron. The central part of said upper portion is spirally wound, while the portions of this member adjoining the ends of the spiral central portion, are straight, i. e. not wound. The upper end of member 12, which is above the spiral portion, is guided by the perforation of registering quadrangular shape, of plate 11. If control pin 6, which is not rotatable, is pressed downward, it glides first over the straight portion of spindle 12 above spiral 14, without causing rotation of spindle 12. Below spiral 14, spindle 12 has again a straight, i. e. not wound portion, over which perforated plate 11 can glide up and down, without causing rotation of spindle 12. The means for effecting control steps which are necessary as a preparation for the advance of the film and are likewise released by control pin 6, are arranged in such manner that said preparatory steps, including tolerances, are carried out before rotation of the spindle starts. The bottom portion of about 1/3 of the total length of the spindle is cylindrical and carries the above described elements for the transmission of control steps.

Driving pin 22 is arranged on spindle 12 in such position that during rotation of the spindle by upward movement of control element 6, pin 22 always occupies a position in the gap between the highest and lowest point of cam 24. In order to make it sure that pin 22 safely occupies a position behind abutting surface 23 of cam 24, upon reaching its initial position, which corresponds to the completely withdrawn position of control element 6, rotary movement of pin 22 must be slightly extended beyond said surface 23. Therefore, the length of the spiral portion of spindle 12 should be slightly in excess of that necessary for bringing about the desired advance of the film. The end portion of cam 24 at abutting surface 23 is provided with a slightly sloped or inclined surface in order to avoid that upon actuating control element 6 and the corresponding rotary movement of pin 22, during locked condition of the film transport, i. e. when collar 28 rests on locking projection 48, pin 22 acts on surface 23, causing inadvertent transport of film.

Figure 6:
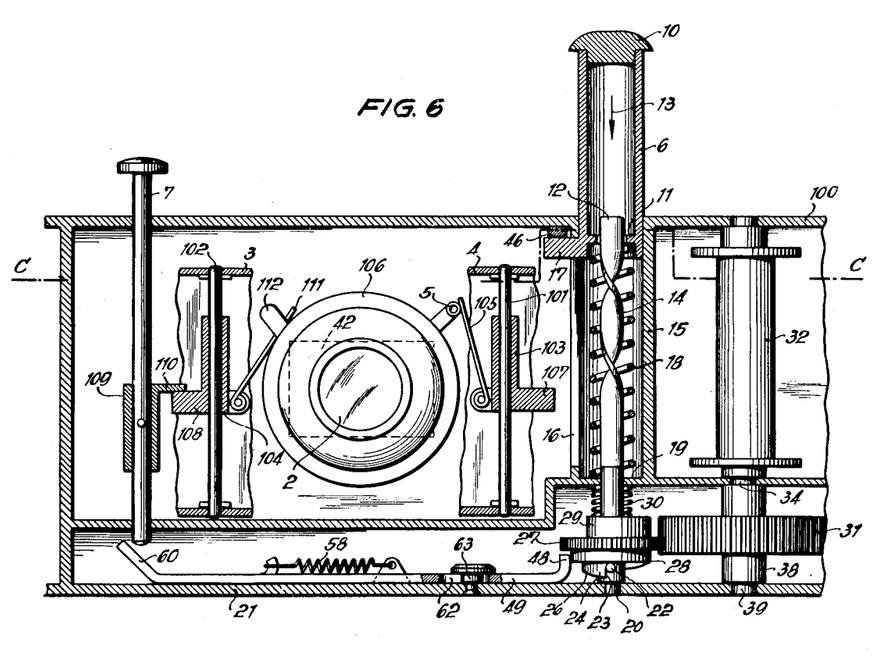
Figure 6 illustrates, in sectional view along line B—B in Figure 8, a camera structure viewed from the front side, including film transport means and film transport lock, means for setting the shutter and means for releasing the shutter; the film transport means is shown in this device in operable position, so that upon depressing pin 6, winding of film spool 32 takes place; for the sake of clarity, the counting device illustrated in Figures 2 and 3, is omitted in Fig. 6.

In the camera illustrated in Figure 6, parts of which used in the means for film transport, film transport lock and counting device, have been already described above, two guide rods or bars 101 and 102, are arranged on opposite sides of the objective, and displaceable members 103 and 104 are movable on said bars. Member 103 is connected by means of connecting rod 105 with setting lever 5 of objective shutter 106 and this member 103 is provided with a lateral projection 107, which extends into the path of projection 17 of control element 6. Member 104, which is displaceable on bar 102, has likewise a lateral projection 108, which serves as a point of engagement for a driving member 109, a lateral extension 110 of which overlaps projection 108. Rod 111 connects part 104 with release lever 112 of shutter 106.

Figure 7:
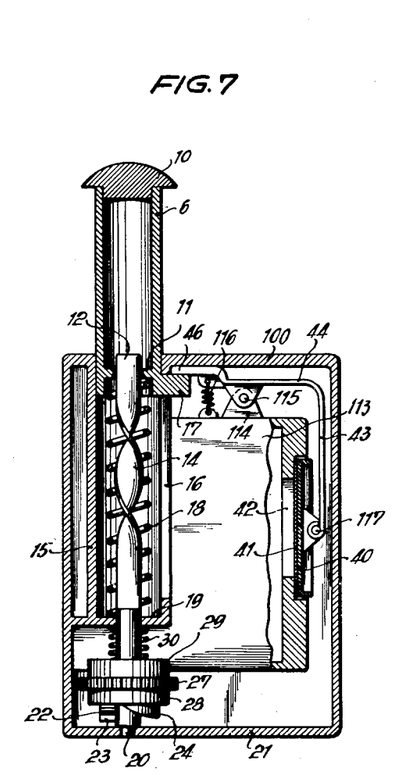
Figure 7 is a sectional view of the camera along line A—A in Figure 8, the film transport device being shown in operable position, with the film pressure plate pressed on, the camera being viewed from the side in this figure.
Figure 8:
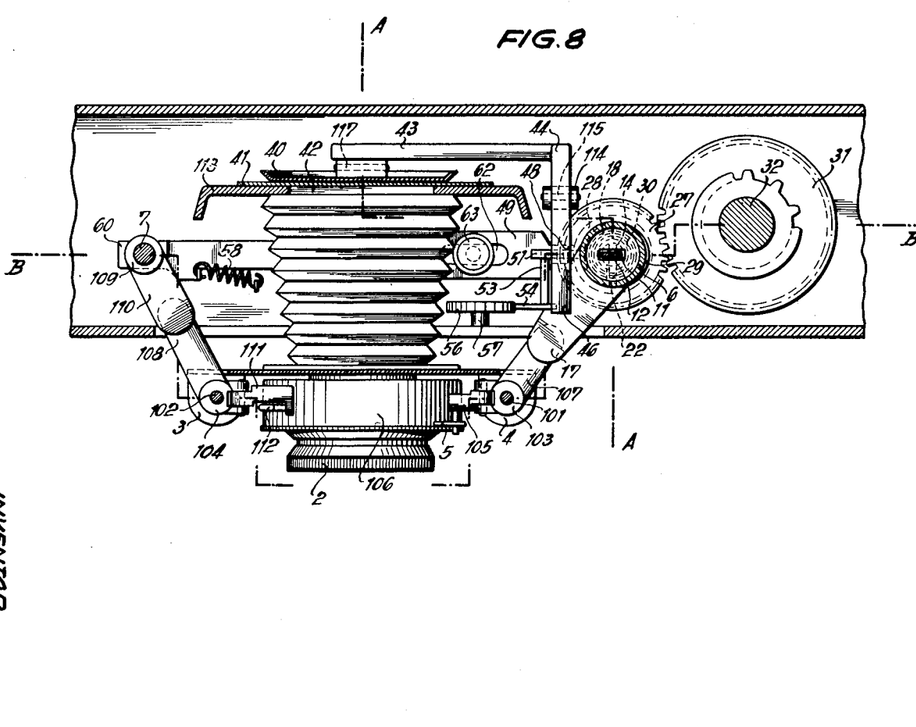
Figure 8 shows the mutual arrangement of parts in the camera and is a sectional view along line C—C in Figure 6, with the objective in taking position.

Figure 7 illustrates the film pressure plate and its cooperation with control element 6. A bearing 114 is provided on stationary camera part 113, said bearing receiving bolt 115, with which angle lever 43, 44 is pivotally connected. 46 denotes the free end of angle lever 43, 44 and this end projects into the space between projection 17 of control element 6 and wall 100. Spring 116 permanently urges said free end 46 of lever 43, 44 in downward direction. Film pressure plate 40 is pivotably connected with arm 43 of the angle lever by means of pin 117 and said plate is adapted to press film 41 toward picture window 42.

The arrangement illustrated in Figures 6 and 7 operates as follows.

Upon applying pressure to control element 6, projection 17 of control element 6 is at once separated from the end part 46 of angle lever 43, 44. The latter is drawn downward by spring 116, so that the angle lever swings about bolt 115 and lifts pressure plate 40 from the film. Thus the film can be freely transported. Immediately after release of the film pressure plate 40, i. e. upon further downward movement of element 6, quadrangular guide aperture 11 reaches spirally wound part 14 of spindle 12, which is then caused to rotate and brings about transport of the film, as described above. During or immediately after transport of the film, projection 17 comes in contact with projection 107 of part 103, which is displaceable on bar 101 and upon downward displacement of the latter, shutter 106 is set by connecting rod 105. When pressure on control element 6 is stopped, the latter advances from the camera to protruding position, under the action of spring 18. Thereby rotation of the spindle in opposite direction takes place and, as described above, rotating members 27, 28, 29 are lifted and the film transport lock is actuated. As soon as control element 6 comes near to its end position, projection 17 again presses end 46 of the angle lever against wall 100. This results in swinging of angle lever 43, 44 and pressing of pressure plate 40 against film 41 so that the film is pressed against the picture window. In order to release the shutter, i. e. to expose the film, pin 7 is pressed in downward direction. Member 109 fastened to pin 7, drives, over projections 110, 108, member 104 sliding on bar 102, in downward direction. Thereby release lever 112 of shutter 106 is actuated by connecting rod 111. Upon pressing down pin 7, i. e. upon release of the shutter, the lower end of pin 7 engages inclined end portion 60 of film transport locking lever 49 and releases film transport in the manner described above.

It is to be understood that the term "steps for preparing for the transport of the film" is used in the present specification and claims to denote and include the steps necessary prior to each advance of the film, such as for example lifting the pressure plate, and shifting, from the locking position to the release position, of elements obstructing advance of the film; the term "inactive surface portions" is used in connection with rotatable member or spindle 12, to denote portions of this member which, in contrast to spiral portion 14 of member 12, are not engaged by guide element 11 when said guide element is moved in downward or upward direction. In connection with lever 49, the term "inactive position" is used to denote the withdrawn position shown in Figure 2, in which end portion 48 of lever 49 does not engage the bottom surface of collar 28; the term "out of engagement position" is used in connection with the unit comprising elements 26, 27, 28, and 29, in order to denote the position shown in Figure 3, in which said unit is not rotated by pin 22; the term "inner end" is used in connection with elements 6 and 12, in order to denote the lower ends of these elements in the drawings; finally the term "safety gap" is used to include the gaps shown in Figure 4 at 76 and between the upper end of spiral 14 and line 78.

It will be understood from the above description and the drawings that the present invention is not limited to the specific elements, designs, steps and other specific details described above and may be carried out with various modifications without departing from the scope of the invention as defined in the appended claims.

Penetration of light into the camera is prevented by the use of bellows fastened at one end to the movable holder 106 of the objective shutter and, at the other end, to stationary camera part 113.

Reference is made to my co-pending application filed under Ser. No. 224,105 on May 2, 1951, now abandoned, of which this is a continuation-in-part.

What is claimed is:

1. A combined shutter-setting and film-transporting mechanism for photographic cameras comprising a single control member adapted to pass through a wall of said camera, said single control member being reciprocatable between an initial position in which it protrudes from the camera to a final position in which it is substantially wholly disposed within the interior of said camera, a projection provided on the inner end of said single control member, a film pressure plate, lever means disposed in the path of travel of said projection for releasing said film pressure plate during an initial fraction of inward movement of said single control member, a shutter setting mechanism, means disposed in the path of travel of said projection for actuating said shutter setting mechanism during a final fraction of inward movement of said single control member, a film transport mechanism, a rotatable member for actuating said film transport mechanism, a shaft disposed at least partially internally of said single control member, means for rotating said shaft during an intermediate portion of movement of said single control member, a one-way clutch for coupling said rotatable member to said shaft during inward movement of said single control member and spring means for returning said single control member to its initial position.

2. A combined shutter-setting and film-transporting mechanism for photographic cameras, comprising a single control member which is provided at its inner end with a projecting part and with centrally arranged guide means for a rotatable member, near said inner end; said control member being adapted to pass through the upper wall of the camera casing and to be depressed from an initial position, in which it protrudes from the camera, downward through a tubular element into the interior of the camera, said tubular element being provided with a longitudinal slot for guiding said projecting part, which releases an end of a double lever adapted under spring effect to release the film pressure plate, during an initial fraction of the downward movement of the control member, in order to prepare for transport of the film; a rotatable member extending in the camera through said tubular member, having a spiral portion of predetermined length as an intermediate portion and inactive portions at both ends of said intermediate portion, and carrying near its lower end an assembly including a pinion and having at its lower end a projecting element for rotating said assembly in order to cause transport of the film by causing rotation of a cog-wheel carried by a film spool of the camera; a spring encircling the rotatable member and permanently urging the control member to its protruding position, being housed by the tubular member; said rotatable member being caused to rotate in alternate directions upon passing said guide means of the control member in downward and upward direction, respectively; rotation of said spiral portion during downward movement of the control member taking place, and substantially simultaneously, shutter setting means being engaged by said projection of the control member, during a predetermined fraction of the downward movement of the control member, the actual end of setting the shutter to occur after the end of advancing the film; said projecting element on the lower end of the rotatable member being adapted to lift said assembly including a pinion, upon upward movement of the control pin, in order to prevent rotation of the pinion and transport of the film during upward movement of the control member; said assembly carried by the lower end portion of the rotatable member, including an eccentric adapted to engage a lever drawn by spring effect to said eccentric and pivoted at a stationary point of the camera, the free end of said lever acting on a toothed counting disc and being caused by said eccentric during each complete revolution of the eccentric, to bring about advance of said disc by one tooth; said projecting part of the control member acting upon return of the control member to its initial position, on said end of said double lever adapted to act on the film pressure plate, in order to press the latter against the film.

3. A mechanism as claimed in claim 2, in which the assembly carried by the lower end of the rotatable member comprises a pinion, a ring segment shaped cam arranged below said pinion, having a sloping bottom surface and encircling about ⅔ to ¾ of the rotatable member, and an eccentric arranged above the pinion, said unit being slidable on the rotatable member from a spring-held operative position to a lifted inoperative position, the projecting element of the rotatable member being adapted to engage said cam in operative position of the assembly and to turn said assembly during rotation of the rotatable member upon downward movement of the control member and to lift said cam and said assembly to the inoperative position during rotation of the rotatable member upon upward movement of the control member.

4. A mechanism as claimed in claim 3, in which a collar is arranged between the cam and the pinion.

5. A mechanism as claimed in claim 3, comprising spring-held means for keeping the assembly in the lifted, inoperative position, said spring-held means being adapted to be withdrawn to an inactive position by actuation of a shutter-release member.

6. A mechanism as claimed in claim 2, in which the control step for preparing for the transport of the film is carried out during a first initial fraction of the downward movement of the control member, and the control step for setting the shutter is carried out during a subsequent fraction of the downward movement of the control member and the lower end, including tolerances, of said initial fraction is separated by a safety gap from the upper end level of the spiral portion of the rotatable member, as well as from the upper end, including tolerances of said subsequent fraction; the lower end level of said spiral surface ending above and being separated by a safety gap from the lower end level, including tolerances, of said subsequent fraction.

7. A mechanism as claimed in claim 2, in which the control member is arranged on one side of the camera for actuation by the left hand and the shutter release means is arranged on the other side of the camera for actuation by the right hand of the operator.

8. A mechanism as claimed in claim 2, in which the rotatable member, in addition to its intermediate spiral portion, has a straight portion adjacent to and above said spiral portion, for preventing start of the film transport prior to the end of preceding control step, including tolerances.

9. A mechanism as claimed in claim 3, in which the projecting element of the rotatable member is arranged to occupy a position between an abutting surface at the highest point of the sloping surface of the cam and the lowest point of this surface, when the rotatable member is rotated by upward movement of the control member.

10. A mechanism as claimed in claim 3, in which the cam has an abutting surface at its highest point and the projecting element of the rotatable member enters below the bottom surface of the cam and causes lifting of the assembly without rotation, during upward movement of the control member, and the length of the spiral portion of the rotatable member is slightly in excess of that necessary for bringing about the desired advance of the film, in order to secure movement of the projecting element until reaching a position behind the abutting surface.

11. A mechanism as claimed in claim 10, in which the cam has a sloping surface at its higher end in order to compensate for the excess stroke needed by the pinion and collar in order to reach the desired lifted position of the assembly.

References Cited in the file of this patent

UNITED STATES PATENTS

| | | |
|---|---|---|
| 931,380 | Burk | Aug. 17, 1909 |
| 1,779,424 | Fairchild | Oct. 28, 1930 |
| 1,821,492 | Briechle | Sept. 1, 1931 |
| 2,094,072 | Kuppenbender | Sept. 28, 1937 |
| 2,111,425 | Goldhammer | Mar. 15, 1938 |
| 2,150,642 | Wachtler | Mar. 14, 1939 |

FOREIGN PATENTS

| | | |
|---|---|---|
| 611,589 | Germany | Apr. 5, 1935 |
| 573,910 | Great Britain | Dec. 12, 1945 |